United States Patent [19]

Berg

[11] Patent Number: 4,678,335

[45] Date of Patent: Jul. 7, 1987

[54] RING LASER GYRO BLOCK STIFFENER

[75] Inventor: Ralph T. Berg, Ham Lake, Minn.

[73] Assignee: Honeywell Inc., Minneapolis, Minn.

[21] Appl. No.: 642,616

[22] Filed: Aug. 20, 1984

[51] Int. Cl.⁴ .......................................... G01C 19/64
[52] U.S. Cl. .................................................. 356/350
[58] Field of Search ...................... 356/350; 372/94, 34

[56] References Cited

U.S. PATENT DOCUMENTS

| 4,085,825 | 4/1978 | Scarborough | 356/350 |
| 4,321,557 | 3/1982 | McNair | 356/350 X |
| 4,436,423 | 3/1984 | Kumor et al. | 356/350 |

FOREIGN PATENT DOCUMENTS 2112202  7/1983  United Kingdom ................ 356/350

Primary Examiner—Vincent P. McGraw
Assistant Examiner—S. A. Turner
Attorney, Agent, or Firm—Robert A. Pajak

[57] ABSTRACT

A laser block for a ring laser angular rate sensor is provided with an expandable ring inserted into a cavity through the block. The ring is rigidly expanded against the walls of the cavity with substantially zero axial deflection to increase the stiffness of the ring laser block with respect to forces perpendicular to its lasing plane.

5 Claims, 4 Drawing Figures

RING LASER GYRO BLOCK STIFFENER

BACKGROUND OF THE INVENTION

This invention relates to the structure of a ring laser gyro and more particularly to an improved structure for maintaining mirror alignment in the presence of forces perpendicular to the lasing plane.

Ring laser gyros of the type to which may invention has particular application are described in U.S. Pat. Nos. 3,467,472, 3,373,650, 3,390,606. As will be appreciated by those skilled in the art, the lasing paths are formed in a solid block made of mechanically and thermally stable material such as CerVit or Zerodur. While such a construction has proved generally satisfactory, forces perpendicular to the lasing plane, such as forces due to acceleration of the gyro, cause deflection of the end mirrors. This limits the usefulness of these devices in an environment in which such forces are significant.

The objective of my invention is to simply yet effectively increase the stiffness of a ring laser gyro with respect to forces perpendicular to its lasing plane.

SUMMARY OF THE INVENTION

Briefly this invention contemplates the provision of a radially expandable ring engaging the hollowed out center of the block. In addition, the block is sandwiched between a pair of stiff cradles which lie in planes generally in parallel to the lasing plane, and include stiffening ribs oriented generally perpendicular to the lasing plane.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
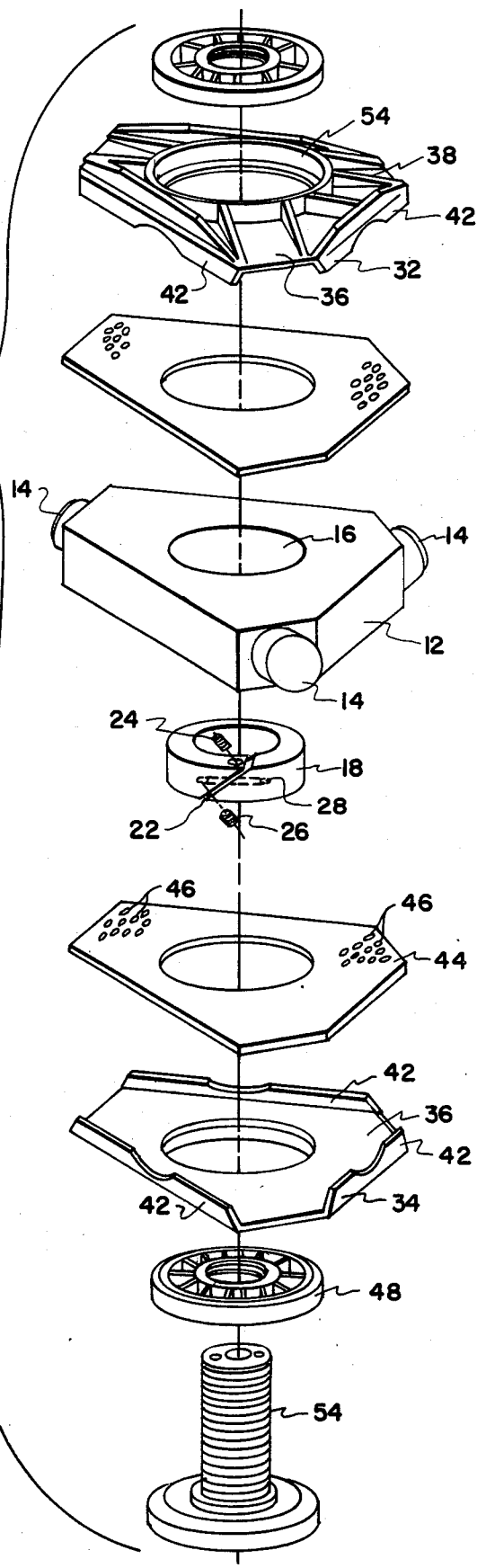
FIG. 1 is a exploded perspective of a ring laser gyro constructed in accordance with the teachings of this invention.

Referring now to FIG. 1 of the drawings, a ring laser gyro block 12 has three mirrors 14 fixed thereto at the ends of the lasing paths. As will be appreciated by those skilled in the art, the block 12 shown in FIG. 1 is merely illustrative and details have been omitted for the purpose of clarity. The block 12 is preferably made of mechanically and thermally stable material, such as the ceramic CerVit or Zerodur.

There is a bore or hollowed out region 16 in the center of the block 12. A radially expandable ring 18 fits into the hollowed out portion of 16.

Figure 2:
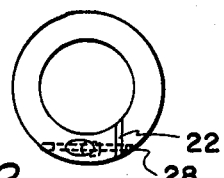
FIGS. 2 and 3 are respective plane and side elevations of an expandable ring used in the practice of this invention.
Figure 3:
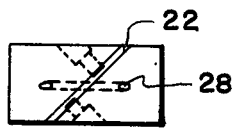
Figure 4:
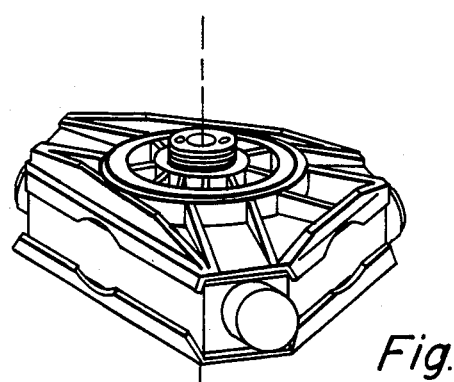
FIG. 4 is a partial sectional view of an assembled ring laser gyro shown in the exploded view of FIG. 1.

Referring now to FIGS. 2 and 3, as well as FIG. 1, the ring 18 is expandable owing to diagonal slot 22 and screws 24 and 26. Screws 24 and 26 engage the surface of the diagonal slot 22, causing the ring to expand until it fits rigidly in the bore 16 of the block 12. A pin 28 prevents axial deflection of the ring as it expands. It should be noted that the height of the ring is approximately equal to the height of the block.

The radial force of the expanded ring ensures a tight engagement between the block and ring, although if desired the ring may also be cemented in place by a suitable cement such as an epoxy.

In a preferred embodiment of the invention, a pair of stiff cradles 32 and 34 engage the opposing surfaces of the block 12. These cradles are preferably indentical and comprise a flat plate 36 which lies in the lasing plane and a series of ribs 38 which are generally perpendicular to the lasing plane. Lips 42 extend over the sides of the block 12 and help position the cradle.

A resilient force distributor 44 is inserted between the cradle and the surface of the block. The force distributor has a plurality of holes 46 to increase its resilience. The force distributor 44 is made of silicon rubber, and the holes 36 are distributed evenly, covering approximately 50% of the surface area of the force distributor 44.

In the embodiment shown, a dithering spring 48 threadly engages a perpendicular collar 54 on the cradles 32 and 34. A post 54 threadly engages the spring 48 and passes through the entire assembly firmly engaging the cradles to the block 12.

What is claimed is:

1. A laser motion sensing device, comprising in combination:
   a block with a passage formed therein defining a lasing path;
   a cavity in said block with its longitudinal axis oriented generally perpendicular to the lasing path; and
   a radially expandable ring shaped member in said cavity and engaging the walls of said cavity, said ring member including means for rigidly expanding said ring against said cavity walls with substantially zero axial deflection.

2. A ring lasing motion sensor as in claim 1 further including a second stiffening member, said second stiffening member generally coextensive with said block and engaging the outer surface thereof.

3. A laser motion sensor as in claim 2 further including a resilient pad disposed between said second stiffening member and said solid block.

4. The device of claim 1 wherein said ring member further comprises a diagonal slot and a pin bridging, said slot to prevent axial deflection of said ring.

5. The device of claim 4 further comprising screws bridging said slot and engaging the surface of said slot, said screws operative to expand said ring.

* * * * *